United States Patent [19]

Ohmura et al.

[11] Patent Number: 4,525,529

[45] Date of Patent: Jun. 25, 1985

[54] POLYESTER RESIN COMPOSITION

[75] Inventors: Yasuhiro Ohmura, Kawasaki; Seiichiro Maruyama; Shigeru Shigemoto, both of Kitakyushu, all of Japan

[73] Assignee: Mitsubishi Chemical Industries Limited, Tokyo, Japan

[21] Appl. No.: 413,555

[22] Filed: Aug. 31, 1982

[30] Foreign Application Priority Data

Sep. 17, 1981 [JP] Japan .................. 56-146615
Sep. 18, 1981 [JP] Japan .................. 56-147580

[51] Int. Cl.$^3$ .............................. C08L 67/02
[52] U.S. Cl. ...................... 525/64; 525/167; 525/176
[58] Field of Search ............... 525/64, 166, 167, 176

[56] References Cited

U.S. PATENT DOCUMENTS

| | | | |
|---|---|---|---|
| 4,022,748 | 5/1977 | Schlichting | 525/176 |
| 4,096,202 | 6/1978 | Farnham | 523/201 |
| 4,346,195 | 8/1982 | Hornbaker | 525/176 |

FOREIGN PATENT DOCUMENTS

| | | | |
|---|---|---|---|
| 2313298 | 12/1973 | Fed. Rep. of Germany. | |
| 53-111354 | 9/1978 | Japan. | |
| 55-021430 | 2/1980 | Japan | 525/64 |
| 55-050058 | 4/1980 | Japan | 525/64 |
| 2042560 | 9/1980 | United Kingdom | 525/64 |

*Primary Examiner*—John C. Bleutge
*Assistant Examiner*—Patricia Short
*Attorney, Agent, or Firm*—Oblon, Fisher, Spivak, McClelland & Maier

[57] ABSTRACT

Flame-retardant polyester resin compositions are disclosed which have improved mechanical properties, particularly improved impact properties. The compositions comprise a halogen-containing copolymeric polyester resin derived from terephthalic acid or its derivative, an alkylene glycol or its derivative and a halogen-containing aromatic diol, said copolymeric polyester resin being blended with a minor amount of a modified ethylene copolymer derived by graft polymerization of an α,β-unsaturated carboxylic acid or its derivative on the backbone of ethylene/α-olefin copolymer, and/or a minor amount of an acrylic rubber.

9 Claims, No Drawings

POLYESTER RESIN COMPOSITION

BACKGROUND OF THE INVENTION

1. Field of the Invention

This invention relates to a polyester resin composition. More particularly, it relates to a flame-retardant polyester resin composition having improved impact properties.

2. Description of the Prior Art

Japanese Laid-Open Specification No. 54494/1974 discloses a flame-retardant polyester resin which is a copolymeric polyester resin derived from a diol, dicarboxylic acid or its ester, and a halogen-containing aromatic diol. Such copolymeric polyester resin, however, has a disadvantage in that if enough of the halogen-containing aromatic diol component is incorporated to provide satisfactory flame retardancy, it causes loss of mechanical properties such as impact strength of the resin to an undesirable extent.

SUMMARY OF THE INVENTION

It is an object of the present invention to provide a polyester resin composition of great commercial value.

It is another object of the present invention to provide a flame-retardant copolymeric polyester resin composition which exhibits improved impact properties.

It has now been found that the impact properties of a flame-retardant copolymeric polyester resin of the type set forth above can be significantly improved without loss of its flame retardancy by blending it with a particular modified ethylene copolymer and/or an acrylic rubber.

Thus, in brief, the present invention provides a polyester resin composition comprising:

(a) a copolymeric polyester resin containing from 3% to 15% by weight halogen which is derived from terephthalic acid or its ester forming derivative, an alkylene glycol having 2 to 10 carbon atoms or its ester forming derivative, and a halogen-containing aromatic diol of the formula:

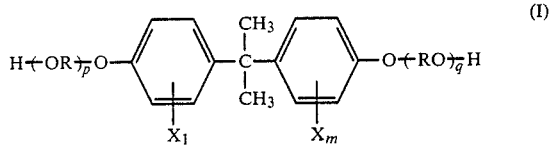

wherein R is an alkylene group having 2 to 4 carbon atoms, X is a halogen atom, l and m are each an integer of from 1 to 4, and p and q are each an integer of from 1 to 10, said copolymeric polyester resin being blended with (b) from 0.5 to 15 parts by weight of a modified ethylene copolymer comprising a copolymer of ethylene and an α-olefin having at least 3 carbon atoms, said ethylene/α-olefin copolymer being modified by graft polymerization with an α,β-unsaturated carboxylic acid or its derivative in an amount of from 0.05% to 1.5% by weight based on the weight of the copolymer, and/or (c) from 0.5 to 20 parts by weight of an acrylic rubber, each per 100 parts by weight of said copolymeric polyester resin.

DESCRIPTION OF PREFERRED EMBODIMENT

The copolymeric polyester resin component (a) used in the present invention is a terpolymer of terephthalic acid or its ester forming derivative, an alkylene glycol having 2 to 10 carbon atoms or its ester forming derivative, and a halogen-containing aromatic diol.

The terephthalic acid monomer may contain other polyacids such as phthalic acid, isophthalic acid, naphthalene dicarboxylic acid, adipic acid, sebacic acid, trimellitic acid and the like in a total amount up to about 30 mole percent. The ester forming derivatives of terephthalic acid include alkyl esters such as dimethyl terephthalate.

The alkylene glycol having 2 to 10 carbon atoms includes ethylene glycol, 1,3-propanediol, 1,4-butanediol, 1,6-hexanediol, 1,10-decanediol and the like, and they may contain other polyhydroxy compounds such as glycerol and pentaerythritol in a total amount up to about 30 mole percent. The ester forming derivative of the alkylene glycol includes ethylene oxide.

The halogen-containing aromatic diol used in the present invention is a compound of the formula:

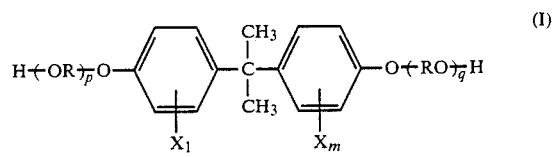

wherein R is an alkylene group having 2 to 4 carbon atoms, X is a halogen atom, l and m are each an integer of from 1 to 4, and p and q are each an integer of from 1 to 10.

Such compound may be prepared, for example, by reacting a halogenated bisphenol-A with an alkylene oxide such as ethylene oxide or propylene oxide or with an alkylene-halohydrin such as epichlorohydrin.

It is usually preferred to employ a compound of Formula (I) wherein R is —CH$_2$—CH$_2$— or

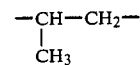

and X is bromine or chlorine. Specific examples of such compound include 2,2-bis[4-(2-hydroxyethoxy)-3,5-dibromophenyl]propane; 2,2-bis[4-(2-hydroxyethoxy)-3,5-dichlorophenyl]propane; 2,2-bis[4-(2-hydroxypropoxy)-3,5-dibromophenyl]propane; 2,2-bis[4-(3-hydroxypropoxy)-3,5-dibromophenyl]propane; 2,2-bis[4-(3-hydroxypropoxy)-3,5-dichlorophenyl]propane; 2,2-bis[4-(2-hydroxyethoxy)-3-bromophenyl]propane; 2,2-bis[4-(2-hydroxyethoxy)-2,3,5,6-tetrabromophenyl]propane and the like.

The above-mentioned three monomers may be copolymerized to form the desired copolymeric polyester resin according to any conventional technique for the preparation of polyester resin. For example, all the monomers may be added to the reactor at the initial ester interchange or esterification stage of the reaction, which is followed by polycondensation. Alternatively, terephthalic acid or its ester forming derivative may be initially reacted with an alkylene glycol or its ester forming derivative to form a bis(hydroxyalkyl) terephthalate or its oligomer, and a halogen-containing aromatic diol of the foregoing Formula (I) is then added to the reactor to effect polycondensation.

The type and amount of the halogen-containing aromatic diol (I) used in the copolymerization should be so selected that the halogen content of the resulting copolymeric polyester resin ranges from 3% to 15% by weight, preferably from 5% to 10% by weight.

If the halogen content of the copolymeric polyester resin is lower, the resin may not have satisfactory flame retardancy. On the other hand, a copolymeric polyester resin of higher halogen content is undesirable due to substantial loss of mechanical properties of the resin.

The modified ethylene copolymer component (b) comprises a copolymer of ethylene and an α-olefin having at least 3 carbon atoms (which will hereinafter be referred to as "unmodified ethylene copolymer") modified by graft polymerization with an α,β-unsaturated carboxylic acid or its derivative in an amount of from 0.05% to 1.5% by weight based on the weight of the unmodified ethylene copolymer.

The unmodified ethylene copolymer from which the modified ethylene copolymer is derived by graft polymerization includes those copolymers consisting essentially of at least 50 mole percent, preferably from 80 to 95 mole percent of ethylene and not more than 50 mole percent, preferably from 20 to 5 mole percent of an α-olefin having at least 3 carbon atoms. The Ziegler-Natta catalysts useful for the preparation of the unmodified ethylene copolymer are, for example, combinations of vanadium compounds such as vanadium oxychloride, vanadium tetrachloride, etc., and organoaluminum compounds.

The α-olefin having at least 3 carbon atoms includes propylene, butene-1, hexene-1, decene-1, 4-methylbutene-1, 4-methylpentene-1 and the like. Among others propylene and butene-1 are preferred.

Preferable unmodified ethylene copolymers include a series of resins commercially available from Mitsui Petrochemical Industries, Ltd. under the trademark "Tafmer". Examples of such resins are ethylene/butene-1 copolymers of Tafmer A series such as Tafmer A4085, A4090, A20090, etc. and ethylene/propylene copolymers of Tafmer P series such as Tafmer P0280, P0480, P0680, P0880, etc.

The α,β-unsaturated carboxylic acid or its derivative (hereinafter referred to as "unsaturated carboxylic acid" for simplicity) with which the backbone of the unmodified ethylene copolymer is graft-polymerized includes acrylic acid, methacrylic acid, ethacrylic acid, maleic acid, fumaric acid, etc. as well as anhydrides and esters of these acids. Of these maleic anhydride is most preferred.

The amount of the unsaturated carboxylic acid to be graft-polymerized on the backbone of the unmodified ethylene copolymer should be in the range of from 0.05% to 1.5% by weight based on the weight of the unmodified ethylene copolymer. If a smaller amount is used, molded articles formed of the resulting copolymeric polyester resin composition may be little improved in impact strength and will have poor tensile elongation and, in addition, surface peeling of the molded articles may occur because of poor compatibility with the copolymeric polyester. On the other hand, a larger amount of the unsaturated carboxylic acid is not desirable because it may cause color development of the composition of the present invention. Preferably, the unsaturated carboxylic acid is present in an amount in the range of from 0.1% to 1% by weight.

The graft polymerization may be carried out in the conventional manner, for example, by adding an unsaturated carboxylic acid to an unmodified ethylene copolymer and melt blending the mixture usually at 150° to 300° C. In the graft polymerization an organic peroxide such as α,α'-bis-tert-butylperoxy-p-diisopropylbenzene may be added in an amount of from about 0.001% to about 0.05% by weight based on the weight of unmodified ethylene copolymer in order to cause the polymerization to occur efficiently.

Preferably, the crystallinity of the resulting graft polymer, i.e., modified ethylene copolymer, for use as component (b) in the present invention is not greater than 75%, more preferably from 1% to 35% (as determined according to the X-ray method described in *the Journal of Polymer Science*, Vol. XVII (1955) pages 17–26) and the melt index is in the range of from 0.01 to 50, more preferably in the range of from 0.1 to 20 (as measured at 190° C. according to the test method ASTM D 1238 57T).

The modified ethylene copolymer having a degree of crystallinity and a melt index as defined above may be prepared by using as a starting material an unmodified ethylene copolymer which possesses a degree of crystallinity and a melt index in the above-defined range.

The modified ethylene copolymer component (b) should be present in the composition of the present invention in an amount of from 0.5 to 15 parts by weight, preferably from about 1 to about 10 parts by weight per 100 parts by weight of the copolymeric polyester resin component (a). If the modified ethylene copolymer is present in a smaller amount, the desired results of the present invention may not be obtained. On the other hand, the presence of a larger amount of the modified ethylene copolymer is not desirable, because the resulting blended composition may have a decreased flame retardancy as well as inferior mechanical properties such as tensile strength and flexural strength.

The acrylic rubber component (c) is an elastomeric polymer formed by either polymerization of an acrylic ester or copolymerization of an acrylic ester and minor amount(s) of other monomer(s). Representative acrylic rubbers are elastomeric polymers prepared by graft polymerization of a copolymer of an acrylic ester (e.g., butyl acrylate) and a minor amount of a cross-linkable comonomer (e.g., butylene diacrylate) with a graft-polymerizable monomer (e.g., methyl methacrylate).

The acrylic ester useful for the preparation of the acrylic rubber includes, in addition to butyl acrylate, methyl acrylate, ethyl acrylate, propyl acrylate, hexyl acrylate, 2-ethylhexyl acrylate and the like. The cross-linkable comonomer includes, in addition to butylene diacrylate, other acrylic or methacrylic acid esters of polyols such as butylene dimethacrylate and trimethylolpropane trimethacrylate; vinyl compounds such as divinylbenzene, vinyl acrylate and vinyl methacrylate; allyl compounds such as allyl acrylate, allyl methacrylate, diallyl maleate, diallyl fumarate, diallyl itaconate, monoallyl maleate, monoallyl fumarate and triallyl cyanurate, and the like. The graft-polymerizable monomer includes, in addition to methyl methacrylate, other methacrylates such as ethyl methacrylate, butyl methacrylate, hexyl methacrylate, 2-ethylhexyl methacrylate and lauryl methacrylate; styrene, acrylonitrile and the like.

A part of the graft-polymerizable monomer may be used in the step of copolymerization of the acrylic ester and the cross-linkable comonomer so as to incorporate the graft-polymerizable monomer in the backbone of the copolymer.

The acrylic rubbers as mentioned above are also commercially available. Examples of such commercially available products are Kaneace FM manufactured by Kanegafuchi Chemical Industry, Vitax V-6401 manufactured by Hitachi Chemical, Metablen W-300 and W-530 manufactured by Mitsubishi Rayon and Acryloid KM-323 and KM-330 manufactured by Rohm and Haas.

The acrylic rubber component (c) should be present in the composition of the present invention in an amount of from 0.5 to 20 parts, preferably from about 1 to about 15 parts, most preferably from 2 to 5 parts by weight per 100 parts by weight of the copolymeric polyester resin component (a). If the acrylic rubber is present in a smaller amount, the desired results of the present invention may not be obtained. On the other hand, the presence of a larger amount of the acrylic rubber is not desirable, because the resulting blended composition may have a decreased flame retardancy as well as inferior mechanical properties such as tensile strength and flexural strength.

According to the present invention, the copolymeric polyester resin (a) is blended with either the modified ethylene copolymer (b) or the acrylic rubber (c) or both. For this purpose, various conventional blending techniques, for example, dry blending of pellets of the copolymeric polyester resin with pellets of the modified ethylene copolymer and/or those of the acrylic rubber, or melt kneading of the dry blend in an extruder followed by extrusion therefrom to form pellets may be employed.

The flame retardancy of the composition of the present invention may be further improved by incorporation of one or more additional flame retardants such as halogenated aromatics without substantial loss of mechanical properties such as impact strength. Examples of halogenated aromatic flame retardants suitable for use in the composition of the present invention include halogenated diphenyls such as hexabromobiphenyl and decabromodiphenyl ether; halogenated bisphenol A and its derivatives such as tetrabromobisphenol-A, polycarbonate oligomers derived from tetrabromobisphenol-A, and tetrabromobisphenol-A type epoxy resins; condensates of halogenated phenols such as tribromophenol condensate; halogenated phthalic anhydrides such as tetrabromophthalic anhydride; polymers of halogen-containing acrylates such as poly(pentabromobenzyl acrylate) and the like. These halogenated aromatics may usually be present in an amount of not more than 10 parts, preferably not more than 7 parts, by weight as halogen per 100 parts by weight of the copolymeric polyester resin.

In addition, the composition of the present invention may optionally contain one or more additives, for example, flame retarding aids such as antimony oxides; reinforcing agents such as glass fibers, carbon fibers and asbestos; fillers such as silica, alumina, silica-alumina, silica-magnesia, calcium silicate, calcium carbonate, glass beads and glass flakes; lubricants such as higher fatty acids and paraffin wax; stabilizers, antistatic agents, antioxidants, dyes, pigments and the like.

The compositions according to the present invention are flame retardant and are improved with respect to impact properties, release properties, melt flow properties and thermal stability. They can readily be processed to form a variety of shaped articles, e.g., various three-dimensional molded articles, various vessels, films, sheets, tubes, etc. by means of conventional molding technique such as injection molding, extrusion or compression molding. The copolymeric polyester compositions of the present invention are particularly suited for forming molded articles useful as industrial materials including electric or electronic parts and automobile parts.

Having generally described the invention, a more complete understanding can be obtained by reference to certain specific examples, which are included for purposes of illustration only and are not intended to be limiting unless otherwise specified.

In the examples all the parts and percents are by weight unless otherwise indicated.

Also in the examples, the flammability was evaluated according to the test UL (Underwriter's Laboratories Inc.) Standard 94 for vertical burning method. In this test a test piece having a thickness of ⅛ or 1/16 inch was held in vertical position by a clamp and a flame 2 cm long was contacted with the lower end of the test piece for 10 seconds. After extinction of the flame from the first contact, the second contact with the flame was given again for 10 seconds. The flammability was evaluated by the ratings of V-0, V-1 and V-2 defined in UL-94.

The impact strength in the examples was the value of ½" notched Izod impact strength determined according to ASTM D 256.

PREPARATION 1—PREPARATION OF COPOLYMERIC POLYESTER RESIN

A reactor was charged with 100 parts of dimethyl terephthalate, 56 parts of 1,4-butanediol, 23 parts of 2,2-bis[4-(2-hydroxyethoxy)-3,5-dibromophenyl]propane and 2 parts of 0.6% solution of tetrabutoxytitanium (catalyst) in 1,4-butanediol. The content was heated at 210° C. for 2 hours to effect ester interchange reaction while the methanol formed was distilled off. Thereafter, 1.3 parts of 0.6% solution of tetrabutoxytitanium in 1,4-butanediol and 1.2 parts of 5% slurry of Irganox 1010 (Ciba-Geigy, stabilizer) in 1,4-butanediol were added and polycondensation reaction was effected while the temperature was gradually raised to 245° C. and the pressure was reduced from atmospheric to 0.3 mmHg. After polycondensation for 5 hours, a copolymeric polyester resin (A) containing 7% bromine and having an intrinsic viscosity [$\eta$] of 0.85 was obtained.

Preparation 2—Preparation of modified ethylene copolymer

In a Henschel mixer 100 parts of ethylene-butene-1 copolymer which contains 14 mole percent of butene-1 and which has a crystallinity of 20% and a melt index of 3.6 was blended with 0.025 part of $\alpha,\alpha'$-bis-tert-butylperoxy-p-diisopropylbenzene dissolved in a minimum amount of acetone and 0.5 part of maleic anhydride. The blend was then melt kneaded and extruded at 230° C. by use of an extruder of 40 mm inner diameter and the extrudate was pelletized to yield the desired modified ethylene copolymer (B) in pellet form.

Some of the pellets were pulverized and then extracted with acetone to remove any unreacted maleic anhydride. The remaining solid was press molded and its maleic anhydride content was determined by infrared spectroscopy. The determination showed that the modified ethylene copolymer contained 0.37% graft-polymerized maleic anhydride.

EXAMPLES 1-3 AND COMPARATIVE EXAMPLES 1-2

The copolymeric polyester resin (A) prepared in Preparation 1, the modified ethylene copolymer (B) prepared in Preparation 2, glass fibers (C) (CS03MA486 manufactured by Asahi Fiber Glass), tribromophenol condensate (Firemaster 935 manufactured by Velsicol) (D) or poly(pentabromobenzyl acrylate) (a polymer melting at 105°–110° C. and containing 70.8% bromine derived by polymerization of pentabromobenzyl acrylate dissolved in propylene glycol in the presence of benzoyl peroxide catalyst) (E), and antimony trioxide (F) were blended in various proportions as indicated in Table 1 below. The blend was then melt kneaded and extruded at 250° C. by use of an extruder of 40 mm inner diameter and the extrudate was pelletized.

The resulting pellets were subjected to injection molding under the conditions of resin temperature of 250° C., mold temperature of 80° C., injection time of 20 seconds and cooling time of 30 seconds using a 3.5 ounce injection molding machine (manufactured by Nissei Jushi Kogyo, Model TS-100) and two types of molds for forming test pieces for flammability test and test pieces defined in the ASTM test method, respectively.

The flammability and impact strength of the injection molded pieces are summarized in Table 1.

For comparison the above procedure was repeated without the modified ethylene copolymer (B) or using, instead of the copolymeric polyester resin (A), poly(butylene terephthalate) manufactured by Mitsubishi Chemical Industries Limited under the trademark Novadur 5008 (intrinsic viscosity 0.85) (G) in combination with the tribromophenol condensate (D) to impart flame retardancy. The results of these comparative examples are also included in Table 1.

EXAMPLES 4-6 AND COMPARATIVE EXAMPLES 3-4

The copolymeric polyester resin (A), modified ethylene copolymer (B), tribromophenol condensate (D) or poly(pentabromobenzyl acrylate) (E), and antimony trioxide (F) as used in the preceding examples were blended in various proportions as indicated in Table 2 and the blend was pelletized and injection molded as described in the preceding examples.

The flammability and impact strength of the molded pieces are given in Table 2 below.

For comparison the above procedure was repeated without the modified ethylene copolymer (B) or using, instead of the copolymeric polyester resin (A), the poly(butylene terephthalate) (G) along with tribromophenol condensate (D) to impart flame retardancy. The results of these comparative examples are also included in Table 2.

TABLE 2

| | Component (part) | | | | | | | |
|---|---|---|---|---|---|---|---|---|
| Example No. | Copolymeric polyester resin (A) | Poly(butylene terephthalate) (G) | Modified ethylene copolymer (B) | Tribromophenol condensate (D) | Poly(pentabromobenzyl acrylate) (E) | Antimony trioxide (F) | Flammability (⅛″) | Impact strength (kg · cm/cm) |
| Example 4 | 100 | 0 | 2 | 9.2 | 0 | 8.6 | V - 0 | 4.2 |
| Example 5 | 100 | 0 | 4 | 9.2 | 0 | 8.6 | V - 0 | 4.2 |
| Example 6 | 100 | 0 | 4 | 0 | 8.5 | 8.6 | V - 0 | 4.9 |
| Comparative Example 3 | 100 | 0 | 0 | 9.2 | 0 | 8.6 | V - 0 | 2.5 |
| Comparative Example 4 | 0 | 100 | 4 | 18.5 | 0 | 8.6 | V - 0 | 2.7 |

EXAMPLE 7 AND COMPARATIVE EXAMPLE 5

The copolymeric polyester resin (A) and modified ethylene copolymer (B) were blended in the proportion indicated in Table 3 below and the blend was pelletized and injection molded as described in the preceding examples.

The flammability and impact strength of the injection molded pieces are given in Table 3.

For comparison the above procedure was repeated without the modified ethylene copolymer (B) and the results of the comparative example are also included in Table 3.

TABLE 3

| | Component (part) | | | |
|---|---|---|---|---|
| Example No. | Copolymeric polyester resin (A) | Modified ethylene copolymer (B) | Flammability (⅛″) | Impact strength (kg · cm/cm) |
| Example 7 | 100 | 2 | V - 2 | 4.7 |
| Comparative Example 5 | 100 | 0 | V - 2 | 2.8 |

TABLE 1

| | Component (part) | | | | | | | | |
|---|---|---|---|---|---|---|---|---|---|
| Example No. | Copolymeric polyester resin (A) | Poly(butylene terephthalate) (G) | Modified ethylene copolymer (B) | Glass Fibers (C) | Tribromophenol condensate (D) | Poly(pentabromobenzyl acrylate) (E) | Antimony Trioxide (F) | Flammability (1/16″) | Impact strength (kg · cm/cm) |
| Example 1 | 100 | 0 | 2 | 30 | 4.5 | 0 | 6.9 | V - 0 | 5.8 |
| Example 2 | 100 | 0 | 5 | 30 | 4.5 | 0 | 6.9 | V - 0 | 6.0 |
| Example 3 | 100 | 0 | 5 | 30 | 0 | 4.2 | 6.9 | V - 0 | 6.4 |
| Comparative Example 1 | 100 | 0 | 0 | 30 | 4.5 | 0 | 6.9 | V - 0 | 4.8 |
| Comparative Example 2 | 0 | 100 | 5 | 33 | 13.8 | 0 | 6.9 | V - 0 | 4.8 |

EXAMPLES 8-10 AND COMPARATIVE (D) to impart flame retardancy. The results of these comparative examples are also included in Table 5.

TABLE 5

| Example No. | Component (part) | | | | | | Flammability (⅛") | Impact strength (kg · cm/cm) |
| --- | --- | --- | --- | --- | --- | --- | --- | --- |
| | Copolymeric polyester (A) | Poly(butylene terephthalate) (G) | Acrylic rubber (H) | Tribromophenol condensate (D) | Poly(pentabromobenzyl acrylate) (E) | Antimony trioxide (F) | | |
| Example 11 | 100 | 0 | 2 | 9.2 | 0 | 8.6 | V - 0 | 4.2 |
| Example 12 | 100 | 0 | 4 | 9.2 | 0 | 8.6 | V - 0 | 4.2 |
| Example 13 | 100 | 0 | 4 | 0 | 8.5 | 8.6 | V - 0 | 5.0 |
| Comparative Example 8 | 100 | 0 | 0 | 9.2 | 0 | 8.6 | V - 0 | 2.5 |
| Comparative Example 9 | 0 | 100 | 4 | 18.5 | 0 | 8.6 | V - 0 | 2.8 |

EXAMPLES 6-7

The copolymeric polyester resin (A), an acrylic rubber prepared by graft polymerization of a copolymer made of 69.3 parts of butyl acrylate, 0.35 part of butylene diacrylate and 0.35 part of diallyl maleate with 30 parts of methyl methacrylate (H), the glass fiber (C), tribromophenol condensate (D) or poly(pentabromobenzyl acrylate) (E), and antimony trioxide (F) were blended in various proportions as indicated in Table 4 below, and the blend was pelletized and injection molded as described in the preceding examples.

The flammability and impact strength of the molded pieces are summarized in Table 4.

For comparison the above procedure was repeated without the acrylic rubber (H) or using, instead of the copolymeric polyester resin (A), the poly(butylene terephthalate) (G) along with tribromophenol condensate (D) to impart flame retardancy. The result of these comparative examples are also included in Table 4.

EXAMPLE 14 AND COMPARATIVE EXAMPLE 10

The copolymeric polyester resin (A) and the acrylic rubber (H) were blended in the proportion indicated in Table 6 below and the blend was pelletized and injection molded as described in the preceding examples.

The flammability and impact strength of the injection molded pieces are given in Table 6.

For comparison the above procedure was repeated without the acrylic rubber (H) and the results of the comparative example are also included in Table 6.

TABLE 6

| Example No. | Component (part) | | Flammability (⅛") | Impact strength (kg · cm/cm) |
| --- | --- | --- | --- | --- |
| | Copolymeric polyester resin (A) | Acrylic rubber (H) | | |
| Example 14 | 100 | 2 | V - 2 | 4.5 |
| Comparative Example 10 | 100 | 0 | V - 2 | 2.8 |

TABLE 4

| Example No. | Component (part) | | | | | | | Flammability (1/16") | Impact strength (kg · cm/cm) |
| --- | --- | --- | --- | --- | --- | --- | --- | --- | --- |
| | Copolymeric polyester resin (A) | Poly(butylene terephthalate) (G) | Acrylic rubber (H) | Glass Fibers (C) | Tribromophenol condensate (D) | Poly(pentabromobenzyl acrylate) (E) | Antimony trioxide (F) | | |
| Example 8 | 100 | 0 | 2 | 30 | 4.5 | 0 | 6.9 | V - 0 | 5.8 |
| Example 9 | 100 | 0 | 5 | 30 | 4.5 | 0 | 6.9 | V - 0 | 6.2 |
| Example 10 | 100 | 0 | 5 | 30 | 0 | 4.2 | 6.9 | V - 0 | 6.6 |
| Comparative Example 6 | 100 | 0 | 0 | 30 | 4.5 | 0 | 6.9 | V - 0 | 4.8 |
| Comparative Example 7 | 0 | 100 | 5 | 33 | 13.8 | 0 | 6.9 | V - 0 | 5.3 |

EXAMPLES 11-13 AND COMPARATIVE EXAMPLES 8-9

The copolymeric polyester resin (A), acrylic rubber (H), tribromophenol condensate (D) or poly(pentabromobenzyl acrylate) (E), and antimony trioxide (F) were blended in various proportions as indicated in Table 5 and the blend was pelletized and injection molded as described in the preceding examples.

The flammability and impact strength of the molded pieces are given in Table 5 below.

For comparison the above procedure was repeated without the acrylic rubber (H) or using, instead of the copolymeric polyester resin (A), the poly(butylene terephthalate) (G) along with tribromophenol condensate (D) to impart flame retardancy. The results of these comparative examples are also included in Table 5 Example 10

EXAMPLE 15

The copolymeric polyester resin (A), acrylic rubber (H), modified ethylene copolymer (B), poly(pentabromobenzyl acrylate) (E), and antimony trioxide (F) as used in the preceding examples were blended in a proportion as indicated in Table 7 and the blend was pelletized and injection molded as described in the preceding examples.

The flammability and impact strength of the molded pieces are given in Table 7 below.

TABLE 7

| Example No. | Component (part) | | | | | Flammability (1/8") | Impact strength (kg · cm/cm) |
|---|---|---|---|---|---|---|---|
| | Copolymeric polyester resin (A) | Modified ethylene copolymer (B) | Acrylic rubber (H) | Poly(pentabromobenzyl acrylate) (E) | Antimony trioxide (F) | | |
| Example 15 | 100 | 2 | 2 | 8.5 | 8.6 | V - 0 | 5.1 |

Having now fully described the invention, it will be apparent to one of ordinary skill in the art that many changes and modifications can be made thereto without departing from the spirit of the invention as set forth herein.

We claim:

1. A polyester resin composition comprising (a) 100 parts by weight of a copolymeric polyester resin containing from 3% to 15% by weight halogen which is derived from terephthalic acid or ester forming derivative thereof, an alkylene glycol having 2 to 10 carbon atoms or ester forming derivative thereof, and a halogen-containing aromatic diol of the formula:

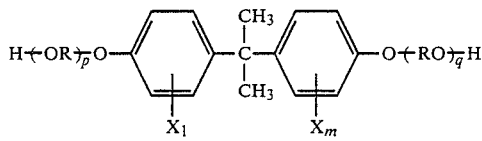

wherein R is an alkylene group having 2 to 4 carbon atoms, X is a halogen atom, l and m are each an integer of 1 to 4, and p and q are each an integer of 1 to 10, and
    (b) from 0.5 to 15 parts by weight of a modified ethylene copolymer consisting essentially of a copolymer of at least 50 mole % ethylene and an α-olefin having at least 3 carbon atoms, said ethylene/α-olefin copolymer being modified by graft polymerization with an α,β-unsaturated carboxylic acid or derivative thereof in an amount of from 0.05% to 1.5% by weight based on the weight of the copolymer.

2. The polyester resin composition according to claim 1, wherein said modified ethylene copolymer is present in an amount of from 1 to 10 parts by weight per 100 parts of the copolymeric polyester resin.

3. The polyester resin composition according to claim 1, wherein said ester forming derivative of terephthalic acid is dimethyl terephthalate.

4. The polyester resin composition according to claim 1, wherein said alkylene glycol is 1,4-butanediol.

5. The polyester resin composition according to claim 1, wherein said halogen-containing aromatic diol is a compound of Formula (I) wherein R is —CH$_2$—CH$_2$— or

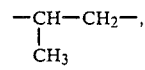

X is bromine or chlorine and 1, m, p and q are defined in claim 1.

6. The polyester resin composition according to claim 5, wherein said halogen-containing aromatic diol is 2,2-bis[4-(2-hydroxyethoxy)-3,5-dibromophenyl]propane.

7. The polyester resin composition according to claim 1, wherein said α-olefin is selected from the group consisting of propylene and butene-1.

8. The polyester resin composition according to claim 1, wherein said α,β-unsaturated carboxylic acid is maleic anhydride.

9. The polyester resin composition according to claim 1, wherein said modified ethylene copolymer comprises a copolymer of ethylene and an α-olefin having at least 3 carbon atoms which is modified by graft polymerization with from 0.1% to 1% by weight of an α,β-unsaturated carboxylic acid or its derivative.

* * * * *